Jan. 15, 1935.    A. HÄNSCHKE    1,987,849
THRUST BEARING WITH FLUID FRICTION
Filed Jan. 2, 1934

Patented Jan. 15, 1935

1,987,849

UNITED STATES PATENT OFFICE 1,987,849

THRUST BEARING WITH FLUID FRICTION

Albert Hänschke, Kiel, Germany, assignor to Fried. Krupp Germaniawerft Aktiengesellschaft, Kiel-Gaarden, Germany Application January 2, 1934, Serial No. 705,015
In Germany June 26, 1933

7 Claims. (Cl. 308—160)

The invention relates to thrust bearings working with fluid friction and comprising thrust bearing surfaces sub-divided into individual tiltable thrust segments, in which the lubricant is enforced to pass through the bearing in such a manner that the fresh lubricant supplied serves to lubricate one single thrust segment only and then is drained.

In known bearings of this type the lubricating oil is supplied to the rubbing surfaces for example by suitably arranged bores provided in the carriers situated between the thrust segments or in other stationary parts of the bearing, special tightening ribs preventing the used lubricating oil from passing over to the adjacent thrust segment.

The present invention has now for its object to achieve in a much simpler manner the advantage of a reliable and ample lubrication by fresh oil than is obtainable by the construction outlined hereinbefore. To this end the invention provides that inclined deflecting members are arranged between the individual thrust segments, which members approach closely the revolving thrust collar of the shaft to be supported by the bearing and, on the one hand, supply the fresh lubricating oil to the thrust segment next following in the direction of revolution and, on the other hand, drain the oil used from the preceding segment.

Figure 1:
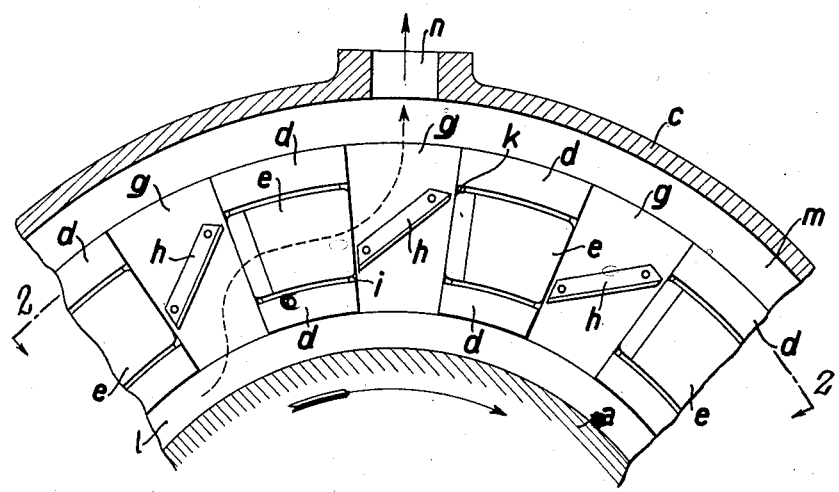
Figure 2:
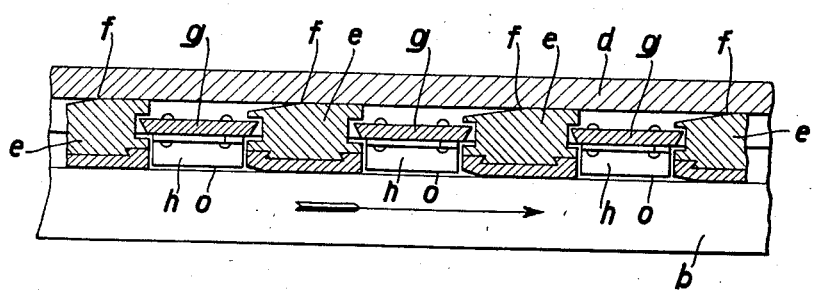

In order that the invention may be clearly understood and readily carried into effect, an embodiment of the same is illustrated by way of example in the accompanying drawing, in which Figure 1 is a fragmentary sectional view of a thrust bearing constructed in accordance with the invention, taken between the thrust segments and the thrust collar and seen from the side of the latter, and Figure 2 is a section on the line 2—2 of Figure 1.

The thrust bearing comprises a revoluble part, viz. the shaft $a$ and a thrust collar $b$, thereon, and a stationary part formed by a ring $d$ enclosed by a housing $c$. In the ring $d$ are mounted in known manner individual thrust segments $e$ which can tilt about the edge $f$. The thrust segments $e$ are secured against motion in circumferential direction by intermediate pieces or carriers $g$ located between them and held in position on the ring $d$.

Now, according to the invention, inclined guide ribs $h$ are provided in the intermediate spaces existing between each two thrust segments $e$, $e$ on the carriers $g$, preferably by riveting, in such a manner as to extend, in the direction of rotation of the shaft $a$ denoted by the arrows, from the inner corner $i$ of the exit side of one thrust segment to the outer corner $k$ of the entrance side of the following segment. The guide ribs $h$ are so dimensioned that their edge $o$ is slightly spaced apart from the thrust collar $b$, damming the intermediate space between adjacent segments $e$, $e$. An annular space $l$ existing between the shaft $a$ and ring $d$ serves to supply the fresh lubricating oil, while the used oil enters the annular space $m$ existing between the ring $d$ and the housing $c$ from where it is drained through the outlet opening $n$, Figure 1.

The described arrangement operates in the following manner:

Fresh lubricating oil is supplied through a conduit (not shown) and a bore in the wall of the housing $c$ to the annular space $l$. From there the oil is carried along with the revolving thrust collar $b$ and owing to centrifugal force tends to flow radially outwards. The side turned toward the shaft $a$, of the guide rib $h$, however, catches the oil and deflects it so that it passes between the thrust segments $e$, $e$ and the thrust collar $b$, whilst the outer side of the guide ribs leads off the oil used coming from the preceding segment, to the annular space $m$. The whole course taken by the lubricating oil is about that marked in Figure 1 by the dotted arrow.

The advantage offered by the described arrangement resides in the fact that the enforced passage, known per se, of the lubricating oil on the slide face of one single thrust segment is obtained by very simple means, viz. by one single guide rib on every carrier $g$, both the inner and outer face of the guide rib being operative. With increasing circumferential speed of the thrust collar $b$, the pressure of the fresh oil accumulated by the guide ribs $h$ before the thrust segments $e$, $e$ also increases so that the lubrication effect is improved automatically without the necessity of increasing the pressure of the lubricating pump. Consequently, the circumferential speed of the shaft and the surface pressure can be increased without reducing the safety of the bearing.

In case the thrust segments $e$, $e$ are secured in position in the thrust bearing by members other than the carriers $g$, the guide ribs $h$ may be fixed to the stationary part of the bearing, for example to the ring $d$.

What I claim and desire to secure by Letters Patent is:—

1. A thrust bearing with fluid friction comprising a plurality of stationary thrust members spaced from each other, and an inclined deflecting member arranged between each two of said thrust members and each adapted both to supply lubricating fluid to the thrust member which follows it in the direction of rotation of the part supported by the bearing, and to lead off the lubricating fluid from the preceding thrust member.

2. A thrust bearing with fluid friction comprising a stationary part, a plurality of thrust members mounted on said stationary part spacedly from one another, intermediate pieces arranged each in the space existing between each two of said thrust members and adapted to secure them against circumferential shifting motion, and an inclined deflecting member likewise arranged in each of said spaces and adapted both to supply lubricating fluid to the thrust member which follows the respective deflecting member in the direction of rotation of the part supported by the bearing, and to lead off the lubricating fluid from the preceding thrust member.

3. A thrust bearing with fluid friction comprising a stationary part, a plurality of thrust members mounted on said stationary part spacedly from one another, intermediate pieces arranged each in the space existing between each two of said thrust members and adapted to secure them against circumferential shifting motion, and an inclined deflecting member provided on each of said intermediate pieces and adapted both to supply lubricating fluid to the thrust member which follows the respective intermediate piece in the direction of rotation of the part supported by the bearing, and to lead off the lubricating fluid from the preceding thrust member.

4. A thrust bearing with fluid friction comprising a stationary part, a thrust collar on the part to be supported by the bearing, a plurality of thrust members mounted on said stationary part spacedly from one another and co-operable with said thrust collar, intermediate pieces each arranged in the space existing between each two of said thrust members and adapted to secure them against circumferential shifting motion, and an inclined deflecting member provided on each of said intermediate pieces so as to tighten toward said thrust collar and adapted both to supply lubricating fluid to the thrust member which follows the respective intermediate piece in the direction of rotation of the part to be supported by the bearing and to lead off the lubricating fluid from the preceding thrust member.

5. A thrust bearing with fluid friction comprising a plurality of stationary thrust members spaced from each other, and an inclined deflecting member arranged between each two of said thrust members and bridging the space between the latter and each adapted both to supply lubricating fluid to the thrust member which follows it in the direction of rotation of the part supported by the bearing, and to lead off the lubricating fluid from the preceding thrust member.

6. A thrust bearing with fluid friction for a rotary member comprising a stationary part, a plurality of thrust members mounted on said stationary part with intermediate spaces between one another, means for securing said thrust members against circumferential shifting movement, and an inclined deflecting member in each of said spaces adapted both to supply lubricating fluid to the thrust member which follows the respective deflecting member in the direction of rotation of said rotary member supported by the bearing, and to lead off the lubricating fluid from the preceding thrust member.

7. A thrust bearing with fluid friction for a rotary member comprising a stationary part, a plurality of thrust members mounted on said stationary part with intermediate spaces between one another, said thrust member adapted to be stationary in a circumferential direction, an annular channel for fresh lubricant adjacent the internal boundary of said thrust members, an annular channel for the used lubricant adjacent the external boundary of said thrust members, an inclined deflecting member in each one of said intermediate spaces having a damming edge abutting said rotary member and extending in the direction of rotation of the rotary member from the exit side of one thrust segment at the point thereof adjacent said fresh lubricant channel to the entrance side of the following thrust segment at the point thereof adjacent said used lubricant channel, whereby each deflecting member both supplies the fresh lubricant to each thrust segment and leads off the used lubricant from the preceding thrust segment.

ALBERT HÄNSCHKE.